United States Patent [19]

Seymour

[11] Patent Number: 4,761,093
[45] Date of Patent: Aug. 2, 1988

[54] UNIFASTENER A PIPE FITTING HAVING A BLIND FASTENER

[76] Inventor: Paul F. Seymour, 1104 Stillwater Dr., Jupiter, Fla. 33458

[21] Appl. No.: 1,568

[22] Filed: Jan. 8, 1987

Related U.S. Application Data

[63] Continuation-in-part of Ser. No. 598,033, Apr. 9, 1984, Pat. No. 4,692,055.

[51] Int. Cl.⁴ .............................................. F16B 7/08
[52] U.S. Cl. .................................. 403/190; 403/234; 403/237
[58] Field of Search ...................... 403/190, 237, 234; 411/55, 60, 57

[56] References Cited

U.S. PATENT DOCUMENTS

| | | | |
|---|---|---|---|
| 2,018,250 | 10/1935 | Cohan | 403/237 |
| 3,598,433 | 8/1971 | Savickas | 403/190 |
| 3,850,534 | 11/1974 | O'Halloran | 403/190 |

FOREIGN PATENT DOCUMENTS

| | | | |
|---|---|---|---|
| 859340 | 6/1940 | France | 411/55 |
| 1171211 | 9/1958 | France | 411/55 |
| 283674 | 10/1952 | Switzerland | 411/55 |
| 873980 | 8/1961 | United Kingdom | 411/55 |
| 1232489 | 5/1971 | United Kingdom | 403/234 |

*Primary Examiner*—Andrew V. Kundrat

[57] ABSTRACT

A pipe fitting of expandable material for joining plastic pipes as used in the manufacture of PVC furniture with fittings and the fastening device being molded together as one unit.

1 Claim, 2 Drawing Sheets

UNIFASTENER A PIPE FITTING HAVING A BLIND FASTENER

CROSS-REFERENCES TO RELATED APPLICATIONS

This application is a continuation-in-part of application Ser. No. 598,033, filed Apr. 9, 1984 and now U.S. Pat. No. 4,692,055.

BACKGROUND OF THE INVENTION

An entire industry has grown around the manufacture of furniture from sections and pieces of P.V.C. pipe and fittings. Overall such furniture looks good to the eye but the pipe to pipe joints detract from it's beauty. Heretofore, P.V.C. furniture has been fabricated using both standard and special design slip fittings that have the look of ordinary plumbing.

P.V.C. fittings are being made that are applied to the outer wall of a receiving pipe; such fittings are know to the trade as a saddle type. Heretofore, the methods used to fasten said fittings to a pipe component have been found lacking in many ways. One method is the application of any ordinary nut and bolt. The bolt is inserted thru center of said fitting and into a drilled hole of a receiving pipe component. The saddle end fits snug against pipe wall and is drawn tight after a nut is applied from inside of said pipe. The nut must be held manually to prevent turning while bolt is being tightened. It is evident that this method is possible only at open ends of a receiving pipe where the nut can be held. Fastening of said fitting away from an open end requires an access hole be drilled thru other side of receiving pipe so that the nut can be applied and tightened. A plastic plug is then inserted into the said access hole for cosmetic appearance. Another method uses a "U" clip pushed under a bolt head to hold said fitting in place. Manual application from inside of the receiving pipe is again required, thus limiting the use to pipe ends. Other means used require the fastening bolt be inserted completely thru the receiving pipe and the fitting being attached. This method leaves the bolt head exposed and unsightly.

SUMMARY OF THE INVENTION

In an effort to produce neat joints that go together quickly and easily the instant invention utilizes the flexibility and expanding properties of the P.V.C. material of which the fitting units are fabricated, i.e (polyvinylchloride). Accordingly several objects of my invention are as follows:

It is an object of the instant invention to provide a quick and easy fastening device and operation for the joining of multiple pipe ends, made of a plastic such as P.V.C, for use other than the transport of liquids.

It is a further object of the instant invention to modify any type or size plastic saddle style fittings so that said fitting and the fastening device or means are molded together as one unit when said fitting is manufactured.

It is still a further object of the instant invention to join multiple pipe ends at any distance from an open and distal end.

It is still a further object of the instant invention to join multiple pipe ends without requiring any parts to be held or tightened from the inside of any such joint.

It is still a further object of the instant invention that pipes of one dimmension can be fastened to each other.

It is still a further object of the instant invention that a pipe of one O.D. can be fastened to a pipe of larger O.D.

It is still a further object of the instant invention that any variable thickness of the receiving pipe wall will not effect application of said invention.

BRIEF DESCRIPTION OF THE DRAWING

Further objects and advantages of the instant invention will become apparent from the following specifications taken together with the accompanying drawings in which.

DESCRIPTION OF THE PREFERRED EMBODIMENT

Figure 1:
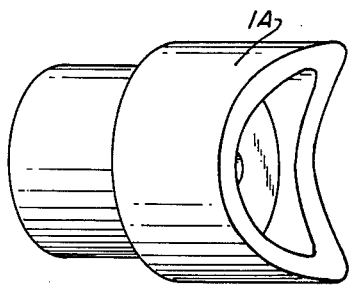
FIG. 1 is a side view of a saddle fitting as now being used and made and is designated to 'Prior Art'.

FIG. 1 is designated as 'Prior Art' and is made and used by the trade for pipe to pipe installation.

Figure 2:
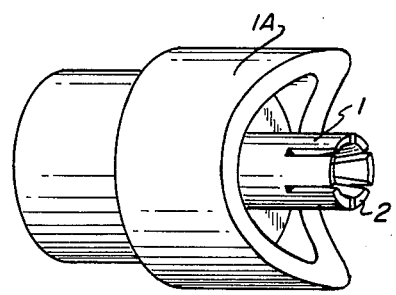
FIG. 2 is a side view of the basic saddle fitting showing the addition of the improvement and marked as section 1.

FIG. 2 is the basic fitting as shown in FIG. 1 with the addition of the improvement and marked section 1.

Figure 3:
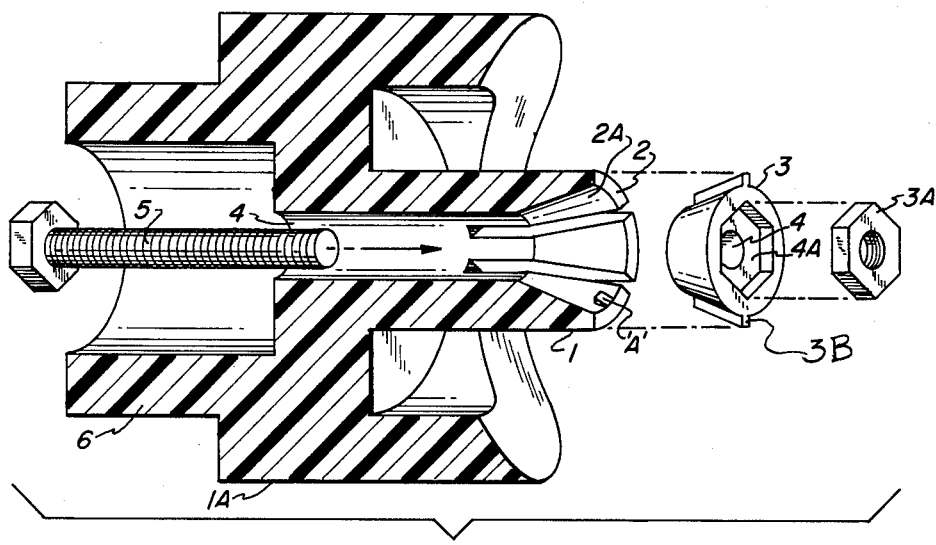
FIG. 3 is a cut-a-way view of FIG. 2 showing details of said section 1.
Figure 3A:
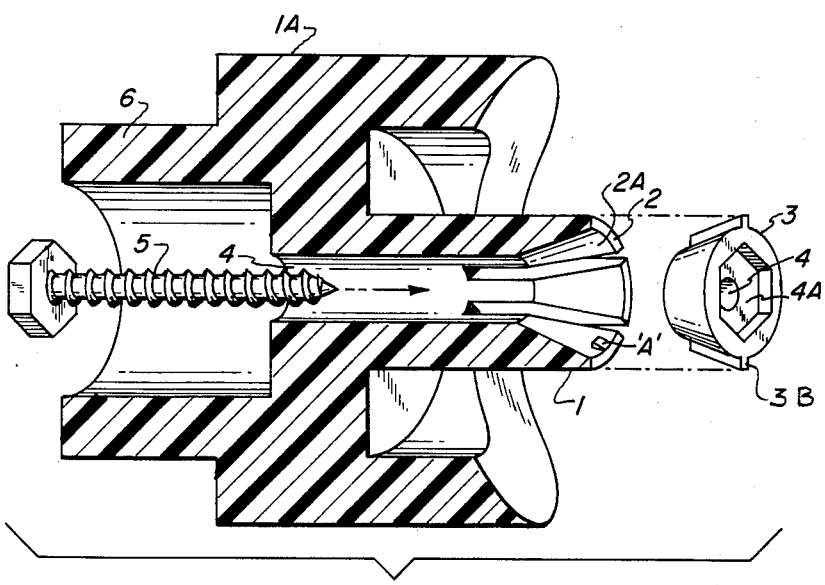
FIG. 3A is a duplicate of FIG. 3 with the exceotion that threaded bolt 5 and nut 3A have been omitted and replaced by a self tapping screw.

FIG. 3 shows the addition of the section 1 as it is molded into the basic fitting 1A. Said section 1 being a circular nipple segmented lengthwise into multiple parts 2. Each segment being independent of the other. The open end of said segmented nipple 1 has a recessed socket section 2A having a generally tapered wall for insertion of the wedge plug 3 which is complimentary to said tapered socket 2A. The bolt 5 inserts thru hole 4 of section 1A and hole 4 of wedge plug 3. 'A' is a tapered protrusion that holds the said wedge plug inside socket 2A. Said wedge plug is pressed into socket 2A which spreads the 'A' segment out which then snaps back over section 3 of FIG. 7 thereby locking said wedge plug in place. The nut 3A is used in socket 4A when a bolt is used. The nut 3A being eliminated when other force means is used, such as a self-tapping screw as shown in FIG. 3A.

Figure 4:
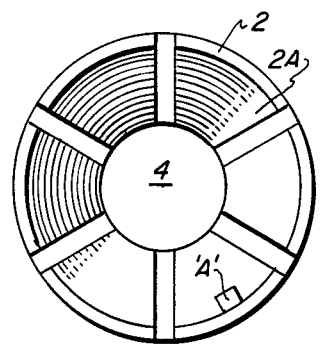
FIG. 4 is a top view of section 1 showing the segmented sections, the recessed socket, and the protruding section "A".

FIG. 4 is a top view of section 1, FIG. 2 showing the segmented sections, the recessed socket and the protruding section 'A'.

Figure 4A:
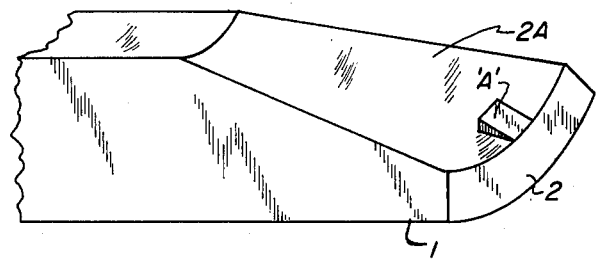
FIG. 4A is an enlarged view of a segment 2 of FIG. 4 showing the addition of a tapered protrusion 'A' on the top inner wall of one tapered segment of section 2 of FIG. 4.

FIG. 4A shows a magnified view of section 'A'. The wedge plug 3 exerts pressure on the section 2 having the protrusion 'A'. Said section 2 is forced out and allows said wedge plug to bottom out in socket 2A. Said section 2 snaps back into place and locks in wedge plug 3.

Figure 5:
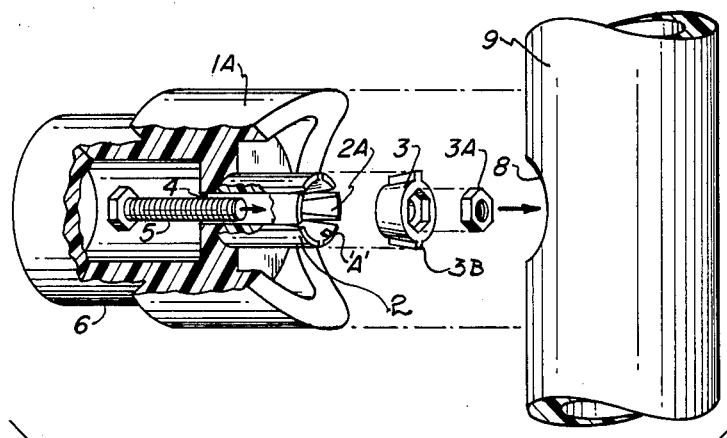
FIG. 5 is an exploded view of all functional parts in proper order.

In FIG. 5 the componant parts are shown in proper order befor assembly. In the assembly a hole or aperture is provided in a receiving pipe 9; said hole is a slip fit for assembled section 1. The wedge plug 3 is set into section 2A. The snap-in function of protrusion A holds the said wedge plug in place. The function of said wedge plug is to exert pressure on the interior wall 2A of section 1 and thereby expanding the segments 2 of FIG. 2. The assembled section 1 is inserted into hole 8 of receiving pipe 9. A force exerting means, such as the bolt 5 as shown in FIG. 3, is drawn up tight. As the force means is drawn tight the wedge plug 3 slides down and therebyspreading and expanding the segments of section 1 apart. Said segments 2 lock behind inner wall of receiving pipe 9.

Figure 6:
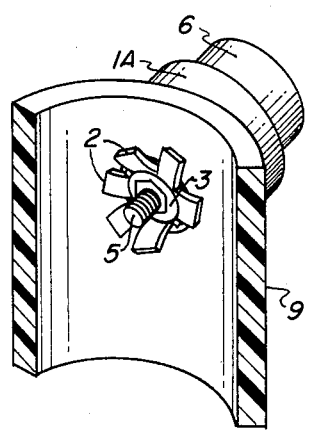
FIG. 6 is a cut away view of the invention after section 1 has been installed in place and expanded.

FIG. 6 shows an interior view of a section of pipe with the invention completely installed. The wedge plug 3 has spread the segments 2 of section 1 apart, said segments being fully locked behind inner wall of said pipe 9.

Figure 7:
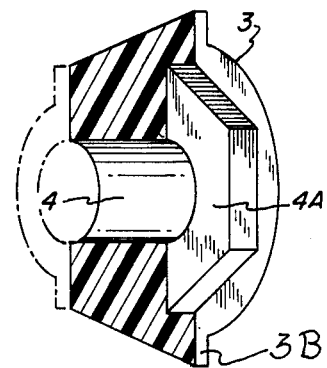
FIG. 7 is a cut-a-way view of the tapered wedge plug 3 showing the recessed socket 4A, the extending fins 3B, and the central hole 4. This wedge means being preferred over the device of the acorn nut as shown in patent application of Apr. 9, 1984, Ser. No. 598,033 and now U.S. Pat. No. 4,692,055.

In FIG. 7 the hole 4 terminates in the section 4A wich is a socket having multiple opposing sides for non-rotative engagement. The fins 3B being complimentary in size to the spaces between the segments 2 of FIG. 4. Said fins 3B slide into said segment spaces and are for non-rotation of the wedge plug 3 in socket 2A of FIG. 3.

While the above description contains many specifities, these should not be construed as limitations on the scope of the invention. One variation being the use of a self tapping screw or bolt as the force means used for expansion. All other functions being the same.

Accordingly the scope of the invention should be determined not by the embodiment illustrated, but by the appended claims and their legal equivalents. Therefore I claim:

1. A joint fitting for connecting a pair of tubular members, one provided with an aperture in its wall, comprising a plug having a longitudinal bore therethrough adapted to fit into an end of one of the members and having a split projection at the other end adapted to enter the aperture of the other member, and expansion means longitudinally movable in the split projection on the plug for clamping engagement with the other member; said split projection terminating in a split socket having plural segments, with each segment being tapered on the internal face, forming a socket having a generally conical taper from top to bottom; a tapered protrusion being provided on an internal top face of said taper for holding said conical wedge plug inside said formed conical socket; said wedge plug having a shape and size complimentary to said socket and having protruding side fins for non-rotating engagement with the said split socket; said wedge plug having a longitudinal bore therethrough for insertion of a threaded force means culminating in the aforesaid clamping engagement.

* * * * *